US007312722B2

(12) United States Patent
Tillotson et al.

(10) Patent No.: US 7,312,722 B2
(45) Date of Patent: Dec. 25, 2007

(54) SYSTEM AND METHOD FOR ASSESSING PARKING SPACE OCCUPANCY AND FOR RESERVING SAME

(75) Inventors: Brian J. Tillotson, Kent, WA (US); Kenneth A. Cobleigh, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 198 days.

(21) Appl. No.: 11/125,363

(22) Filed: May 9, 2005

(65) Prior Publication Data

US 2006/0250278 A1 Nov. 9, 2006

(51) Int. Cl.
*B60Q 1/48* (2006.01)

(52) U.S. Cl. .................................................. 340/932.2

(58) Field of Classification Search ............. 340/932.2; 705/13

See application file for complete search history.

(56) References Cited

U.S. PATENT DOCUMENTS 5,910,782 A * 6/1999 Schmitt et al. ........ 340/995.12
6,694,259 B2 * 2/2004 Curbow et al. ............. 701/213
6,750,786 B1 * 6/2004 Racunas, Jr. ............. 340/932.2
2003/0112154 A1 * 6/2003 Yoakum et al. .......... 340/932.2
2004/0032342 A1 * 2/2004 Dunning .................. 340/932.2
2004/0068433 A1 * 4/2004 Chatterjee et al. ............ 705/13

* cited by examiner

*Primary Examiner*—Jeffery Hofsass
*Assistant Examiner*—Hongmin Fan
(74) *Attorney, Agent, or Firm*—Gates & Cooper LLP

(57) ABSTRACT

A method and apparatus for determining the availability of a plurality of parking spaces and of reserving one or more of such available parking spaces is disclosed. The method comprises the steps of accepting data indicating an occupancy status of at least a subset of the plurality of parking spaces; generating a parking database describing an availability of one or more of the parking spaces from the accepted data; accepting a request from a user, the request being for data describing the availability of the one or more of the parking spaces from the parking database; and providing the data describing availability of the one or more of the parking spaces to the user.

47 Claims, 6 Drawing Sheets

SYSTEM AND METHOD FOR ASSESSING PARKING SPACE OCCUPANCY AND FOR RESERVING SAME

BACKGROUND OF THE INVENTION

1. Field of the Invention

The present invention relates to systems and methods for traffic control, and in particular to a system and method for monitoring and reserving parking spaces.

2. Description of the Related Art

Transportation remains a formidable problem in many urban environments. Public transportation, while often convenient, is often limited in scope and operation periods, with many starting points and destinations inadequately served. Bicycles can be used for transportation, but bicycles are inconvenient in hot, cold, or wet weather, difficult traffic conditions on roads with inadequate shoulders, or where the user wants to arrive in formal clothes. As a consequence, although their use often results in substantial traffic delays, the automobile remains the most popular form of transportation in many urban and suburban environments.

Beyond traffic delays, there are other disadvantages with the popularity of the automobiles as a medium of transportation. Notable among these disadvantages is where to park the automobile at or near the destination of interest. Parking at many popular destinations is often difficult or impossible to find, particularly at events which draw large numbers of people at designated times (e.g. sporting events, concerts, etc.).

A person planning a trip downtown to a theater, say, can easily use the Internet to find the address of the theater and a preferred route to reach it. What the person cannot find is a map showing parking lots near the destination, and he or she particularly cannot find information about which parking lots have or might have available parking spaces, or where there might be available parking spaces along a curb for street parking. As a result, the person must drive to a location near his or her destination and then begin a search for a parking space. He or she may be fortunate and find an inexpensive parking space quickly, or may drive for an extended period of time before settling for an undesirable parking space (distant from the destination, unsafe, and/or costly). The uncertainty in how long it will take to find a parking space also causes wasted time. A person may arrive twenty minutes early for an appointment because they felt compelled to leave their starting point early enough to assure adequate time to find a parking space, wasting time that could have been spent on other activities. Similarly, if the person does not allow enough time for any expected search for a parking space, they will arrive late at the ultimate destination. This not only results in perhaps missing a portion of the event or meeting that the person was to attend, it can also waste the time of people who were waiting for us at the destination. Wasted time can also result in wasted money.

Searching for parking spaces also increases traffic load on many urban streets. Many cars on downtown streets are not en route to a destination, but are circling and searching for a place to park. This increases traffic congestion, energy consumption, noise, and air pollution.

What is needed is an apparatus and method for providing parking information to prospective users of those spaces, and for reserving those spaces. The present invention satisfies that need.

SUMMARY OF THE INVENTION

To address the requirements described above, the present invention discloses a method and apparatus for determining the availability of a plurality of parking spaces and of reserving one or more of such available parking spaces. In one embodiment, the method comprises the steps of accepting data indicating an occupancy status of at least a subset of the plurality of parking spaces; generating a parking database describing an availability of one or more of the parking spaces from the accepted data; accepting a request from a user, the request being for data describing the availability of the one or more of the parking spaces from the parking database; and providing the data describing availability of the one or more of the parking spaces to the user. The invention can also be embodied in a parking space management system with an operations center. The operations center has a parking database and a database interface. The parking database describes the availability of one or more of the parking spaces, and is generated using data describing an occupancy status of at least a subset of the plurality of parking spaces. The database interface accepts data indicating the occupancy status of at least a subset of the parking spaces, accepts a availability and reservation requests from users, and provides data describing the availability and reservations for the parking spaces to the user.

In one embodiment, the system uses sensors to detect empty parking spaces. This can be accomplished by counting the number of cars entering and leaving a parking lot, and using the difference to determine if there are any available spaces. In another embodiment, this is accomplished with sensors dedicated to one or more individual parking spaces. The system uses a network and computer processors to collect and classify information from these sensors and to deliver information regarding parking spaces. An interface allows authorized users to find tailored information regarding those parking spaces.

In another embodiment, authorized users can reserve parking spaces at a given lot (or particular parking spaces within that particular lot) for a given time interval, and if desired, pay for them in advance. Automatic routing software can also provide optimal routing to the parking space, based upon user input regarding the ultimate destination (and other factors, if desired). Hence, the present invention provides an system by which customers, optionally for a fee, can request and receive data on parking availability, reserve a parking space, and pay for the reserved parking space in advance.

In one embodiment, the system also presents advertising by businesses located in the vicinity of the parking lot or parking space to the user requesting parking data availability and/or a parking reservation. This permits highly specific directed advertising to be accomplished, and also allows a business model in which businesses pay for such advertising based upon customers who actually travel to the vicinity of the business, rather than simply those who view it.

BRIEF DESCRIPTION OF THE DRAWINGS

Referring now to the drawings in which like reference numbers represent corresponding parts throughout.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
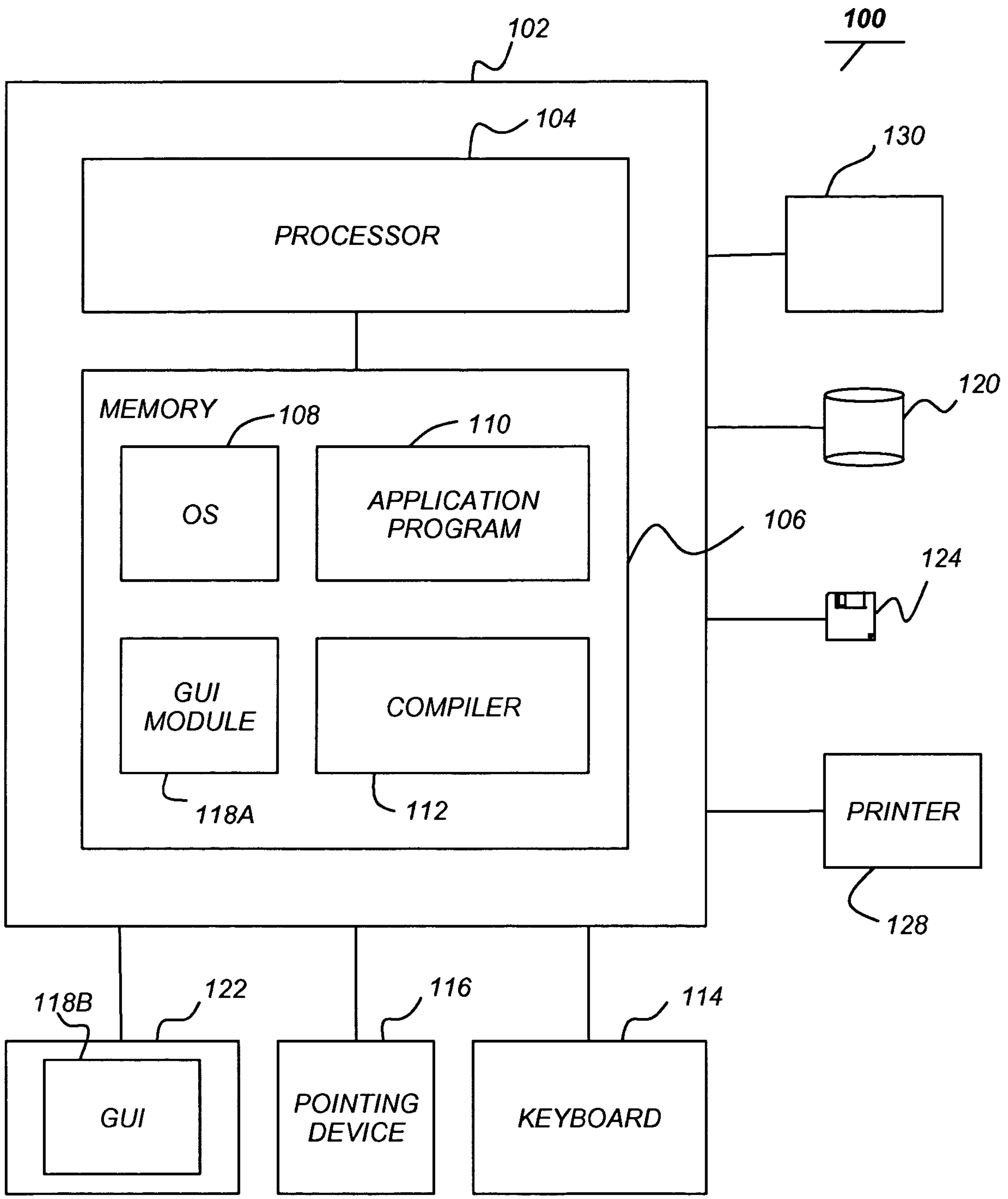
FIG. 1 is a block diagram showing an exemplary hardware environment for practicing the present invention.

FIG. 1 illustrates an exemplary computer system 100 that could be used to implement selected elements of the present invention, including the operations center 202, the user interface 218, and the reservation terminal 256. The computer 102 comprises a processor 104 and a memory, such as random access memory (RAM) 106. The computer 102 is operatively coupled to a display 122, which presents images such as windows to the user on a graphical user interface 118B. The computer 102 may be coupled to other devices, such as a keyboard 114, a mouse device 116, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106, and interfaces with the user to accept inputs and commands and to present results through a graphical user interface (GUI) module 118A. Although the GUI module 118A is depicted as a separate module, the instructions performing the GUI functions can be resident or distributed in the operating system 108, the computer program 110, or implemented with special purpose memory and processors. The computer 102 also implements a compiler 112 which allows an application program 110 written in a programming language such as COBOL, C++, FORTRAN, or other language to be translated into processor 104 readable code. After completion, the application 110 accesses and manipulates data stored in the memory 106 of the computer 102 using the relationships and logic that was generated using the compiler 112. The computer 102 also optionally comprises an external communication device such as a modem, satellite link, Ethernet card, or other device for communicating with other computers.

In one embodiment, instructions implementing the operating system 108, the computer program 110, and the compiler 112 are tangibly embodied in a computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of instructions which, when read and executed by the computer 102, causes the computer 102 to perform the steps necessary to implement and/or use the present invention. Computer program 110 and/or operating instructions may also be tangibly embodied in memory 106 and/or data communications devices 130, thereby making a computer program product or article of manufacture according to the invention. As such, the terms "article of manufacture," "program storage device" and "computer program product" as used herein are intended to encompass a computer program accessible from any computer readable device or media.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Overview

Figure 2:
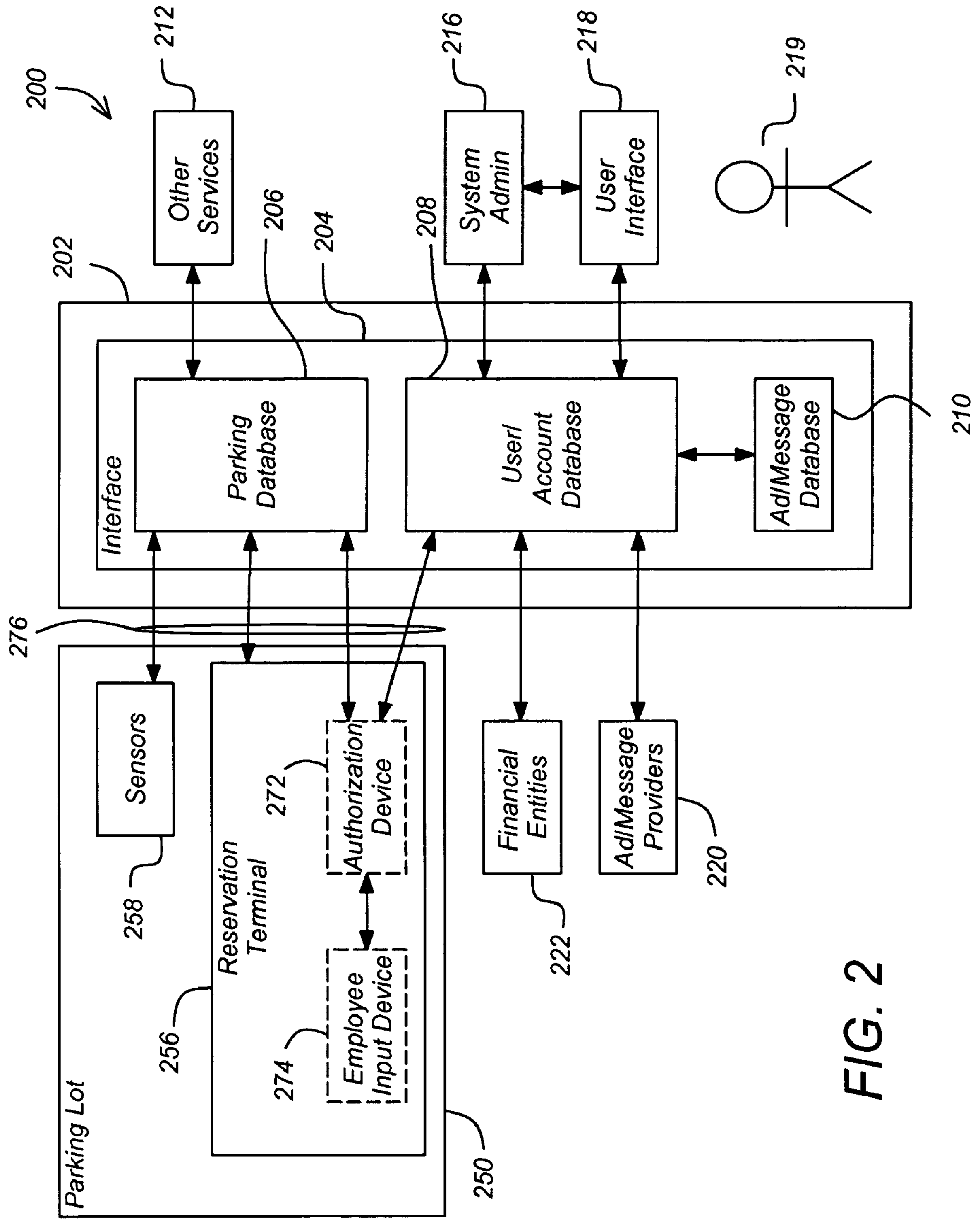
FIG. 2 is a diagram illustrating elements of the parking space information and reservation system.

FIG. 2 is a diagram illustrating elements of the parking space information and reservation system (PSIRS) 200. The PSIRS 200 comprises an operations center 202 which collects information regarding the parking spaces in one or more parking areas or lots 250. The operations center 202 comprises a parking database 206, a user account database 208 and an optional advertisement/message database 110. These databases can be of a variety of different database types, including relational, object-relational, and object-oriented databases. The databases 206-210 can be implemented by separate processors communicatively coupled to separate memory devices, or by a single processor communicatively coupled to a single memory device, such as one or more hard drives, or separate processors and memory devices as desired. Users 219 can include subscribers who have paid a periodic charge for access to the PSIRS 200, users 219 who pay a per-use charge, or users 219 who are provided access for free. In such cases, operating expenses and profit for the PSIRS 200 can be derived at least in part from the owners of the parking lots 250 included in the PSIRS 200.

Database interface 204 manages the data resident in one or more of the databases 206-210, and thus stores, retrieves, maintains, and performs the requisite processing of the data stored in the databases 206-210 as required. The database interface 204 also provides an interface so that entities external to the databases 206-210 can add or delete data, perform data processing and maintenance, and respond to database queries and commands. The interface 204 may be implemented by the same processor as the databases 206-210, or one or more separate processors.

Users 219 access the PSIRS 200 via a user interface 218, which typically includes some combination of hardware (H/W) and software (S/W) elements such as a the computer system illustrated in FIG. 1, a personal data assistant (PDA), telephone, cellphone, or similar device with analogous functionality. The user interface 218 can be disposed at the user's residence, carried by the user 219, provided in the user's automobile and integrated with in-board navigation systems. In embodiments in which user access is controlled, the data used (1) to determine whether the user should be provided with access, (2) for billing purposes, and (3) specific user data (such as favorite parking lots/structures or favorite parking spaces within those lots/structures) stored, retrieved, and managed by a user/account database 208. Data about parking availability is maintained in the parking database 206 and may come from sensors and/or attendants at the parking areas 250. To prevent malicious inputs, employee input (e.g. via employee input device 274) must be authorized via an authorization device 272, such as a password-protected screen.

Initial user access can be granted by use of the interface 204, or by access via the PSIRS 200 system administrators 216. The database interface 204 also permits system administrators 216 to execute system administration and maintenance activities such as adding new user 219 accounts or compiling statistics on usage.

Through the database interface 204, financial entities 222 (such as banks and credit card companies) and advertisement/message providers 200 are also given access to the user/account database 208 for purposes of conducting automated billing and credit card authorization.

The advertisement/message database 210 stores messages that can be presented to users 219 on the user interface 218, as well as conditions under which each such message should be presented and a record of the occasions when each ad/message is actually displayed to the user. Using the database interface 204, the user/account database 208 controls access to the advertisement/message database 210 so that only authorized advertisement message providers 220 can load or update advertisements and messages.

In embodiments of the PSIRS 200 that support reservations, reservation data is stored in the parking database 206. One or more of the parking areas 250 may include a reservation terminal 256 that is communicatively coupled to the operations center 202 via communications link 276. Communications link can be wireless or wired, and may include communications via the Internet.

The reservation terminal enforces reservations by controlling access to parking areas or parking spaces. For example, in cases where physical access to the parking lot 250 is controlled by an electronic gate, the reservation terminal 256 might be a keypad where the subscriber enters a reservation code or a terminal that accepts and reads printed vouchers. In embodiments where physical access to the parking area 250 is monitored and/or controlled by an on-site attendant, the reservation terminal 256 might comprise a computer (such as computer 100) having display 122 showing which slots are reserved, the name of the user 219 that reserved each one, whether that user 219 has paid in advance, and the time the user 219 is scheduled to leave the parking space 304. The display may also show, for each parking space, at what times it is reserved, and by whom. Parking area(s) 250 optionally also include one or more sensors 258, which provide information regarding the occupancy of the parking spaces within the parking area 250 to the operations center 202 via communications link 276 or through an independent communications link.

The operations center 202 can also provide access to other services 212, which can include a wide variety of services available on the Internet, e.g. routing provided by an automated routing source such as MAPQUEST a, pinpoint forecast for weather near the parking area, or a geographical information system (GIS) that shows the user a representation of the place he's trying to find, as well as click-through access to advertiser web sites. Revenue can be generated from any of these provided services.

Figure 3:
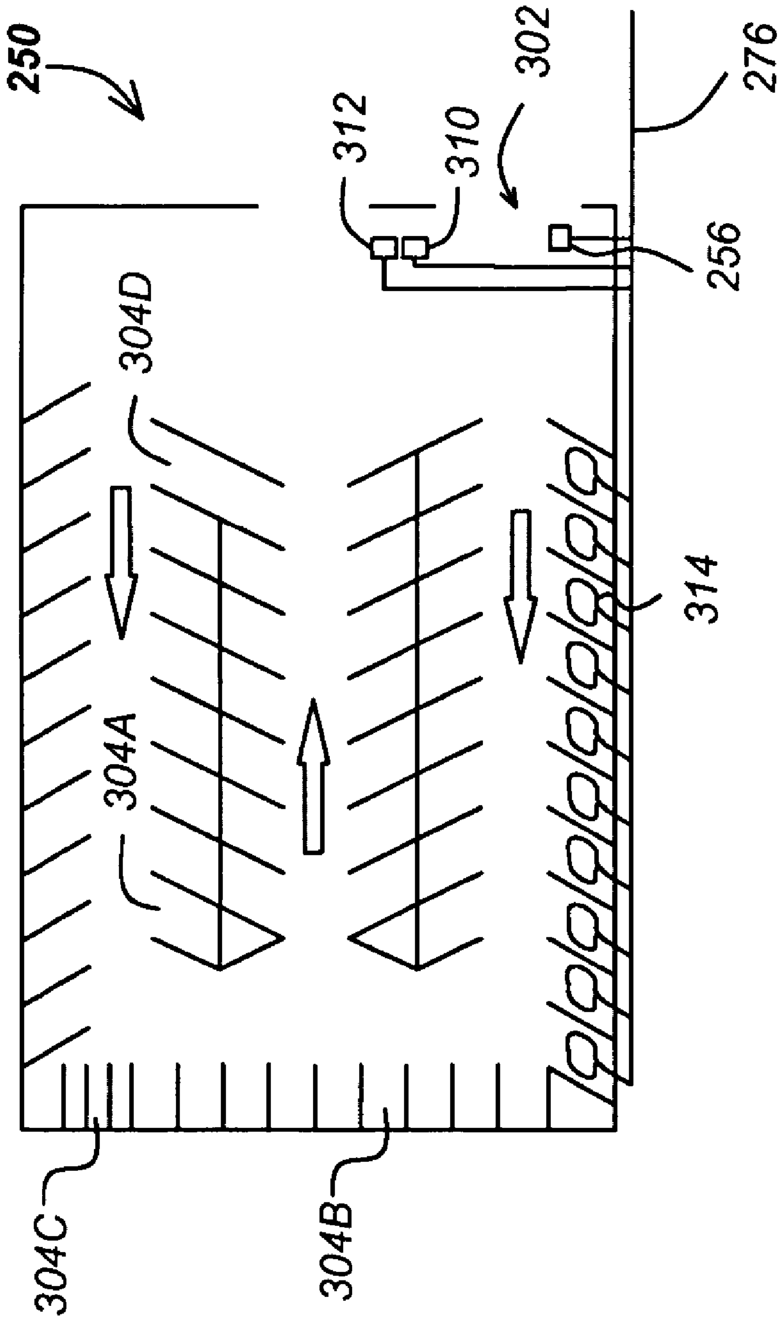
FIG. 3 is a diagram is a diagram showing further details of the parking area.

FIG. 3 is a diagram showing further details related to the parking area 250. The parking area 250 includes a plurality of parking spaces 304, which can include one or more full-sized parking spaces 304A, one or more compact sized parking spaces 304B, one or more motorcycle parking spaces 304C, and one or more recreation vehicle or large sport utility vehicle parking spaces 304D.

Operation

Figure 4A:
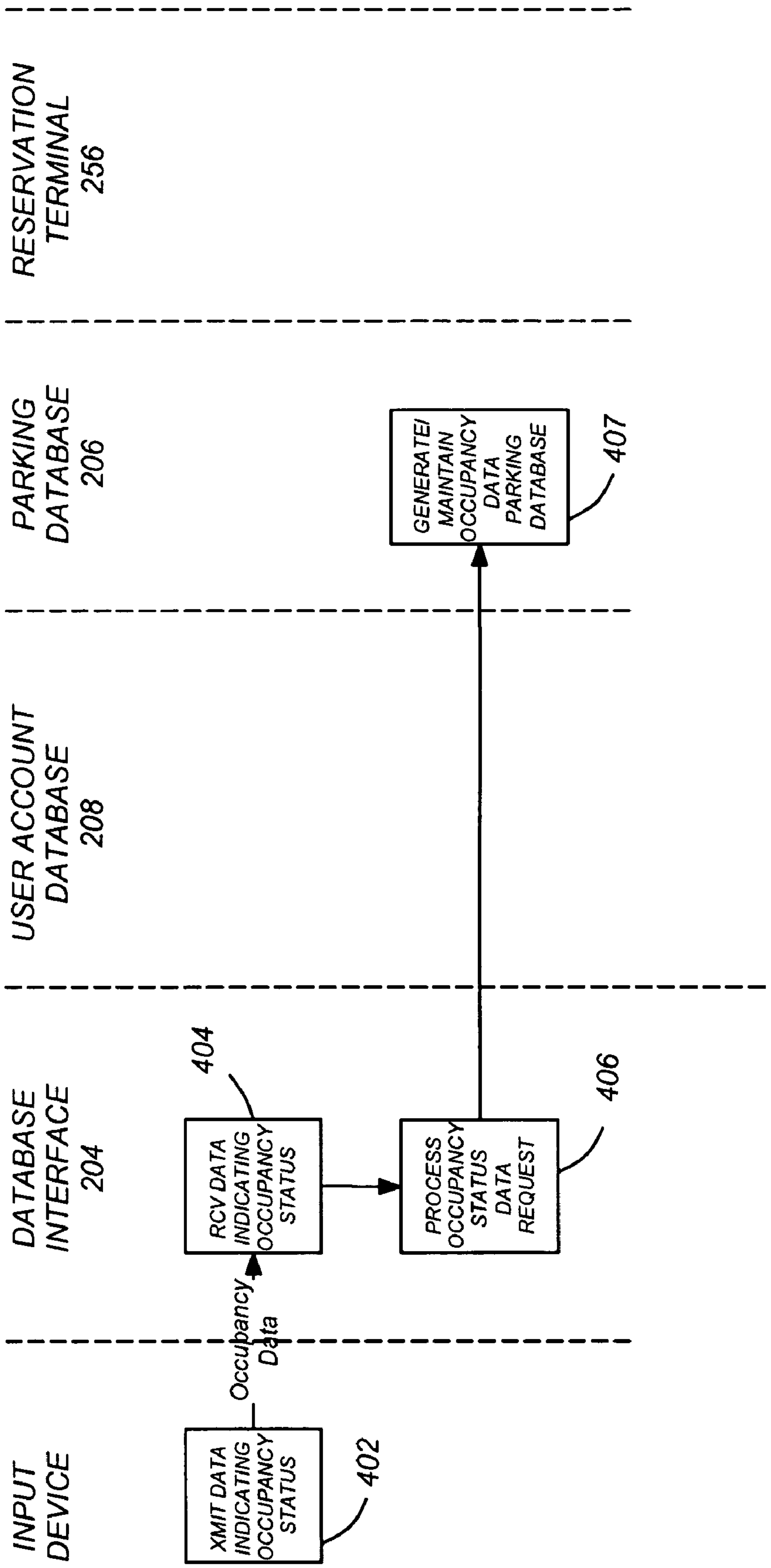
FIGS. 4A-4C are diagrams showing how selected embodiments of the present invention may operate.
Figure 4B:
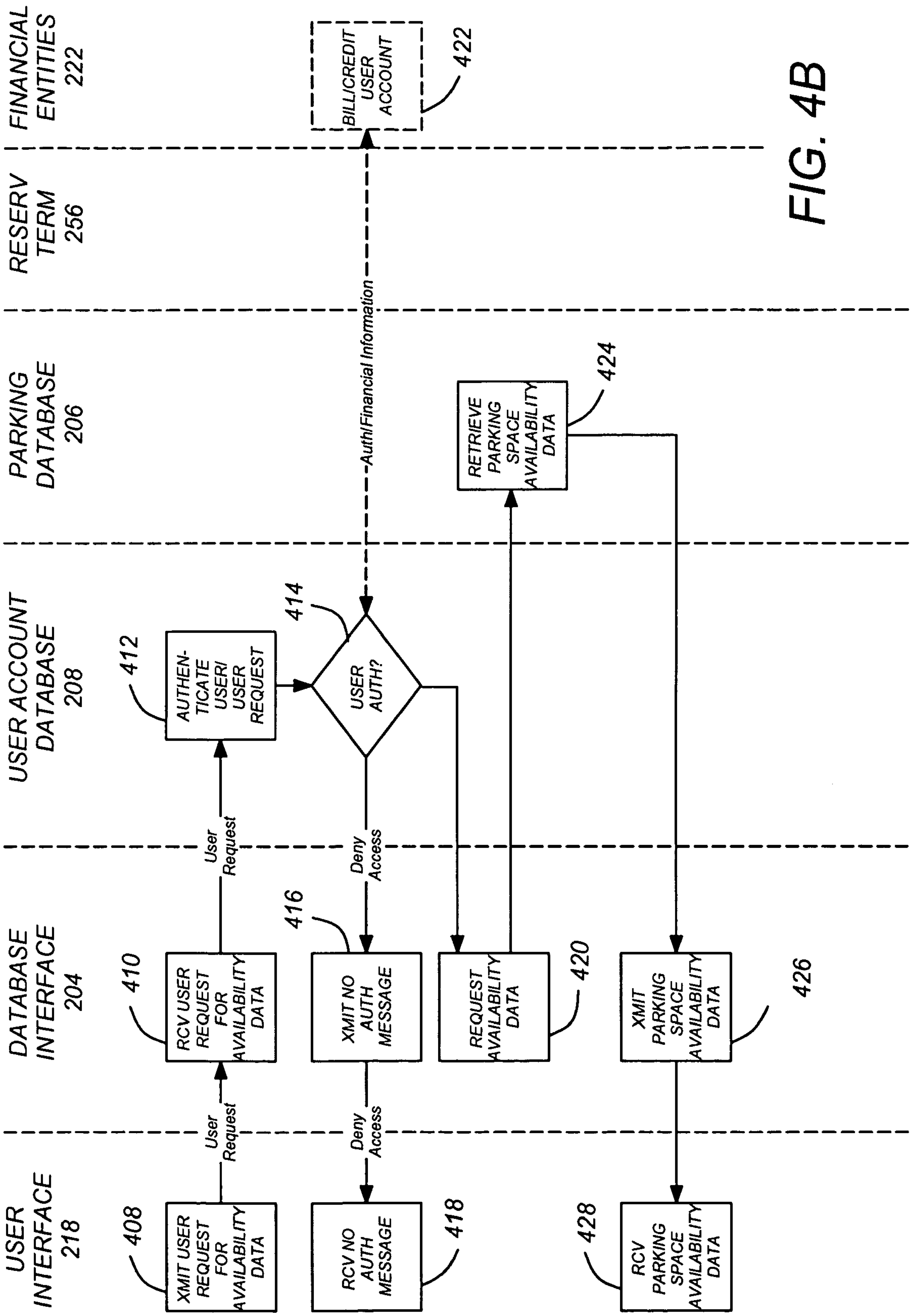
Figure 4C:
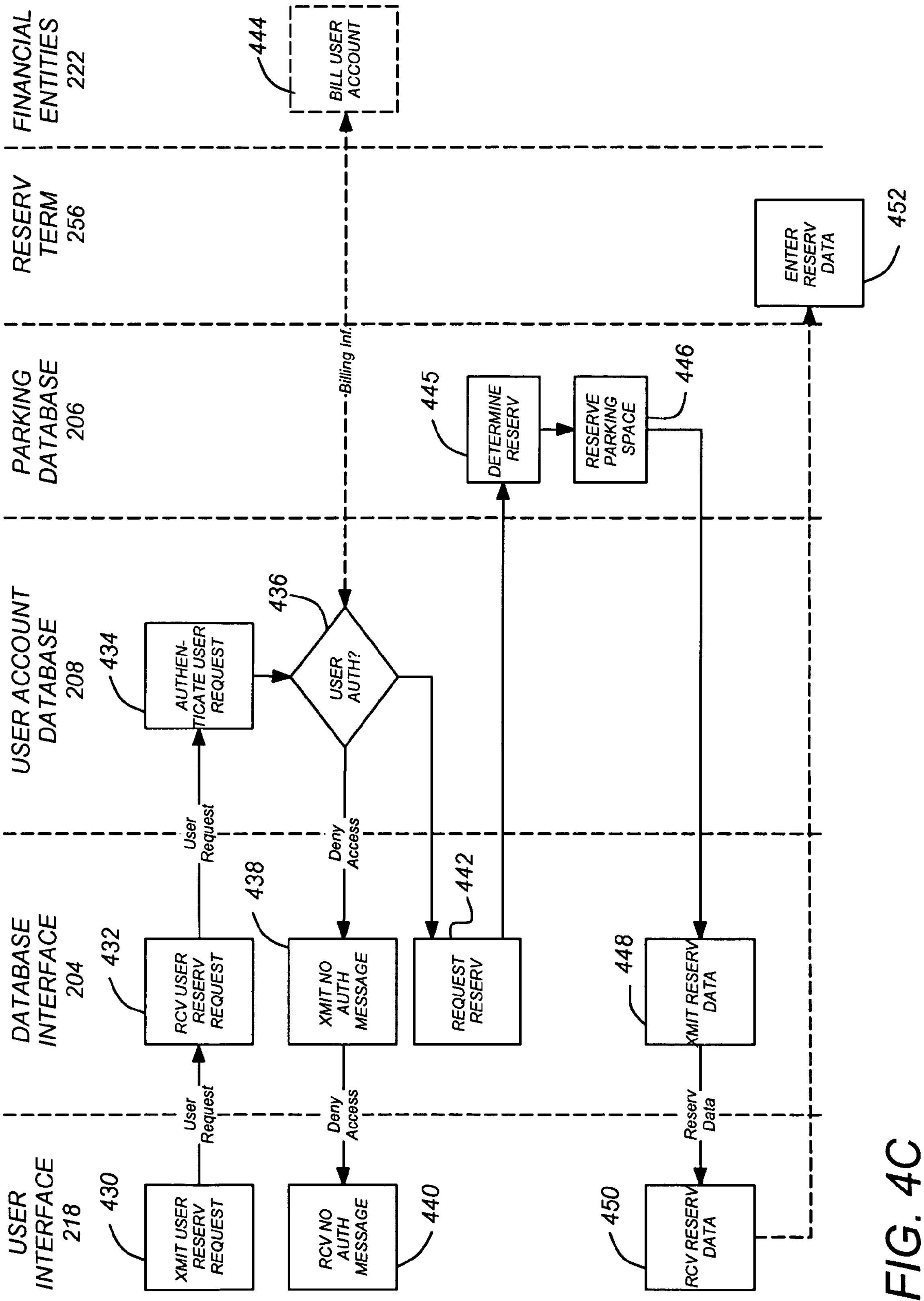

FIGS. 4A-4C are process flow charts illustrating the operation of selected embodiments of the invention. As shown in block 402, an input device transmits data indicating the occupancy status of one or more parking spaces in a parking area 250. That data is received by the database interface 204, as shown in block 404. The data may be transmitted/received over an Internet connection, dedicated telephone line, or wireless transmission.

The input device can take a variety of forms. In one embodiment, the input device is a sensor 258 disposed at or adjacent to each parking space 304, or the parking area 250. The PSIRS 200 uses a common interface between the parking database 206 and the sensors 258, so data from a wide range of sensor 258 types can be used without special modification. Likely sensors 258 include optical sensors such as cameras, magnetic or ferrous sensors embedded in the parking surface (such as ferrous loops 414), ultrasonic sensors, radio detection and ranging (RADAR) sensors, light detection and ranging (LIDAR) sensors, and (where access is controlled by gates) sensors that count of vehicles entering and exiting the parking area 250.

Since each type of sensor 258 may produce a unique form of raw data, the PSIRS 200 combines each sensor 258 with appropriate processing and formatting mechanisms to produce data that comply with database interface 204 requirements. When used with appropriate processing and formatting, the physical sensors 258 can be viewed as "logical" sensors that use physically sensed observables to arrive at a logical conclusion regarding whether the parking space 304 serviced by the sensor(s) is occupied or not.

For example, one example of logical sensor is a digital camera connected to a processor that runs software which identifies empty parking spaces 304 in the camera images, loads the results into a properly formatted internet protocol (IP) packet, and provides the packet to the parking database 206.

The sensors 258 can send data when the system polls the sensor 258, when the sensed parking space 304 occupancy changes, or at periodic or aperiodc intervals. Most sensors 258 are fixed in place, but the PSIRS 200 may be implemented with mobile sensors such as cameras mounted on GPS-equipped vehicles. Further, users 219 who provide parking data from their vehicles to the system may earn a reduced fee.

The PSIRS 200 may also use predictive models to help users 219 find parking where no current sensor 258 data is available. For example, prior data for a particular parking lot may show that it's 98% likely to have an empty space starting at 5:00 PM on weekdays except during baseball home games. Likewise, prior data might show that the mean lifetime of an empty spot on 15th street between 1:00 and 3:00 PM on weekdays is 45 seconds; this can help users 219 decide whether to grab the first parking space 304 they find or keep looking for a better one. Prior data can come from mobile sensors 258 that are not currently on the scene, from temporary sensors 258 used specifically to gather statistical data, from sensors 258 that are currently off line or occluded, or from human estimates in areas where no measured data are available.

Input devices for counting the number of vehicles entering and leaving the parking area may comprises an entry counter 310 for sensing the entry of vehicles into the parking area 250 and an exit counter 312 for sensing the exit of vehicles from the parking area 250. Although such devices cannot determine the availability of a particular parking space, these devices permit the number of available parking spaces within the parking area 250 to be determined, and thus, permits reservation of a parking space 304 within the parking area 250.

The input device may also comprise a magnetic card issuer and reader, PROX card interface, USB interface, or any other device which can be used to regulate the entry and exit of vehicles from the parking area 250.

It is noted that the occupancy status of the parking spaces 304 in the parking area 250 can be determined by a combination of the above as well. For example, the occupancy status of selected parking spaces 304 such as "end" parking spaces can be determined by an attendant, while the number of available parking spaces for the entire parking area 250 can be determined by entry and exit sensors (310, 312).

As shown in block 406 of FIG. 4A, the occupancy status data is processed, and provided to the parking database 206 The parking database 206 generates and maintains availability data and other information using the accepted occupancy data. This is shown in block 407. The parking database 206 may also be generated and managed by the database interface 204 or cooperative operation of the database interface 204 and the parking database 206.

FIG. 4B is a diagram illustrating an exemplary process implicated when the user 219 requests parking availability data. Using user interface 218, the user 219 transmits a user request message to the data interface 204 to request availability data describing the availability of one or more of the parking spaces 304, as shown in lock 408. The database interface 204 receives and processes the request, as shown in block 410.

The present invention can be practiced in several embodiments. In one embodiment, only authorized users 219 are permitted to obtain availability data and to reserve parking spaces. In another embodiment, all users 219 are permitted to obtain availability data, but only authorized users 219 are permitted to reserve parking spaces. In another embodiment, all users 219 are permitted to obtain availability data, and to reserve parking spaces. Users may be "authorized" by enrolling in the PSIRS 200. Enrollment and billing for PSIRS 200 services can be as one-time use basis, a renewable subscription basis, or a lifetime subscription.

FIG. 4B illustrates an embodiment in which the user must be enrolled order to obtain parking space availability data and is billed for accessing that data.

The user request may simply indicate the user's destination. In this case, the PSIRS 200 will return data for currently available parking spaces 304 of parking areas 250 in the PSIRS 200 that are within a "reasonable" distance from the destination, and may also present availability data extending forward in time for a baseline time period (such as six hours). The PSIRS 200 can also use predicted weather and other information to determine the "reasonable" distance. For example, if the weather is dry and temperate, a "reasonable" distance may be a tenth of a mile, but if the weather is snowy and cold, the baseline "reasonable" distance may change to a lower value. In another embodiment, the user request indicates the user's destination and the acceptable distance from the destination to the parking areas of interest, and the PSIRS 200 limits the responses to parking spaces within that distance. In another embodiment, once the user enters the destination, the user is provided with a list of available parking areas 250 for user selection, and the data provided by the PSIRS 200 is limited to those selected parking areas 250.

Users 219 can also be allowed to set priorities among many attributes of parking spaces, enabling the system to automatically recommend a parking space 304 that best meets the user's need. For example, some users may put priority on inexpensive parking even if it's far from their destination; others may prefer a short walk regardless of cost. Attributes of parking spaces 304 can include cost, proximity to the trip destination, elevators, or public conveyances, size (important to people with large vehicles or who tow a trailer), security (e.g. is it lit at night and/or have an attendant), indoor vs. outdoor, and (for outdoor) shade vs. no shade. Users may also assign default priorities that vary depending on the time of day or on current or forecast weather (temperature, wind, precipitation). This avoids the inconvenience of setting different priorities for each trip to accommodate changing conditions. Users may also specify categories of parking spaces (e.g. compact versus full size).

The user request may also specify a particular time interval for which parking space availability information is sought. Alternatively, if a time interval is not specified, a timeline of parking space availability can be provided as a function of the time of day.

The user/account database 208 may store additional data about each user, including, for example (1) the user's preferred interface settings, (e.g. English vs. Spanish, or high vs. low resolution graphics) (2) priorities of parking space 304 attributes as described above (3) a history file that lists recent destinations and provides an option to clear all or part of the history, (4) history of advertisements displayed to this subscriber and his click-through responses. Items (1)-(3) improve convenience for the subscriber, while item (4) improves value for advertisers 220.

The database interface 204 provides the user request to the user account database 208, where the user or user request is authenticated, as shown in block 312. If the user or user request is not authenticated, a message indicating that access has been denied is generated and transmitted by the database interface 204 to the user interface 218, where it is provided to the user 219. If the user 219 or use request is authorized, the database interface 204 transmits a message to the parking database 206 requesting parking space availability data, as shown in blocks 420 and 424.

User authorization can be provided by use of information from financial entities 222 and the user account database 208. For example, if the user 219 has provided a credit card number for a one-time use of the system, that credit card information is provided to the financial entities 222, and if approved, the user account is billed as shown in block 422, and an indicia of the approval is transmitted to the user account database 208. Although direct communications between the user account database 208 and the financial entities 222 are shown in FIG. 3B, such communications can also be made through the database interface 204.

Returning to FIG. 4B, block 424 illustrates the parking database 206 retrieving parking space availability data. This data is provided to the database interface 204, which transmits the information to the user interface, as shown in blocks 426 and 428.

FIG. 4C is a diagram illustrating exemplary process steps used to reserve a parking space within the PSIRS 200. Using the user interface 218, the user 219 transmits a reservation request to the database interface 204, as shown in block 430. The reservation request may have the same parameters as the availability request. That is, it typically include destination and time interval for which a parking space is needed (e.g. from 2 PM to 4 PM) near the Metropolitan Concert Hall. The reservation request may also include parking preference parameters, and other information. In one embodiment, the reservation request is submitted simply by selecting attributes of the parking space availability data presented in block 428 of FIG. 4B. This can be accomplished, for example, by selecting a parking space 304 and a time interval which has been indicated as available.

The reservation request is received by the database interface 204, as shown in block 432. If the user or user request for a reservation requires authentication (e.g. because the user has not yet been authenticated, or has not been enrolled in the PSIRS 200 to permit reservations to be made), blocks 434-440 and 444 present processes analogous to those shown in FIG. 4B. If the user is authorized to request a reservation, the database interface 204 requests a reservation from the parking database 206, as shown in block 442. Using the information resident in the parking database 206, and the reservation request parameters provided in the reservation request, the parking database 206 determines which parking spaces 304 meeting the reservation request parameter are available, as shown in block 445. If one or more parking spaces 304 meeting the user's requirements are available, the requisite number of such parking spaces are reserved, and the reservation information is transmitted to the user interface 218, where it is received and presented to the user 219, as shown in blocks 446-450.

If parking space(s) 304 meeting the user's requirements are not available, this information is provided to the user 219 via the database interface 204. Suggested changes to the reservation request may also be provided which will result in an available parking space 304 (e.g. a different time of day, or a parking area more remote from the destination). After the user 219 provides updated user requirements, the system repeats the operations of blocks 445-450.

If a plurality of parking spaces 304 meet the user's requirements, this information may be transmitted to the user interface 218 to allow the user 219 to select a desired parking space. Upon selection, the selected parking space(s) 304 are reserved 446. Reservation information is provided to the user 219 via the database interface 204 as described above.

In any of the above cases, the user 219 can then be prompted to affirm that they wish to reserve a parking space 304 with the current parking space parameters before billing, if desired.

The reservation information can include, for example, information describing the precise location of the parking area 250 and perhaps the location of a particular parking space 304, as well as driving directions from the user's location to the parking area 250 and/or space 304. The location information can provide (1) an address (2) a location relative to the destination, e.g. "three blocks north of your destination, on the right", (3) a location relative to the user's current location, e.g. "two blocks east, one block west", (4) the name of a parking location that is familiar to this user, e.g. "the Diamond lot at 5th and Pine", (5) a latitude and longitude, or (5) as a marked location on a digital map display. Further, all these choices or subsets thereof may be made available to the user 219.

This reservation information is also useful for confirming the reservation of the parking space 304. For example, the reservation information may comprise a voucher which can be offered by the user 219 as proof of the reservation and the pertinent reservation information (e.g. the parking area 250, duration of the parking reservation, and any other parameters, such as the identity or location of the reserved parking space 304). The voucher may be printed by the user 219 using printer 128 and taken to the parking area 250 to confirm the reservation. The voucher may be a sequence of numbers that are entered into a reservation terminal 256 at or near the parking area entrance 302 via a keypad or other device, may be a printed bar code that is read by a device at the parking area entrance 302. The voucher also may be provided to an attendant at the parking area entrance 302. This is shown in block 452.

Once the user is permitted into the parking area 250, they drive to a reserved parking space (or, in embodiments in which specific parking spaces are reserved, the reserved parking space), and park their vehicle.

The PSIRS 200 can also be used to regulate where users park their vehicles in the parking are 250. For example, it is possible to use the sensors 258 to determine if a vehicle has taken more than one parking space 304. An attendant can be alerted, or if the identity of the user 219 can be ascertained (e.g. from the reservation), and the offender can be billed for both parking spaces.

The parking area 250 can be arranged to enforce vehicle size limitations if desired. That is, compact parking spaces 304B may be grouped together and securely delineated from full-size parking spaces 304A (e.g. by separate entrances and fencing). Sensors 258 can be used to confirm that the size of the vehicle is not in excess of what is permissible in a compact space and corresponds to what was reserved. The user may also be asked to provide a license number when making the reservation, and this information can be compared to a database of registered vehicles to confirm that the vehicle is the size as claimed. Upon arrival, the vehicle's license plate can be read by an attendant or a camera coupled to a computer with character recognition capabilities to assure that the vehicle entering the parking space is the one for which the reservation was made.

To assure that other user's reservations can be honored, it is important to assure that users 219 evacuate their vehicles from the parking spaces 304 when the reserved time expires. This may include towing the vehicles which overextend their stay in the parking space 304 (users 219 may be required to explicitly provide permission to have their car towed if they exceed the reservation period). It may also include assessing additional parking fees and perhaps fines if the vehicle is not timely removed. This can be accomplished via further billing of their account. Such additional fees and/or fines can be graduated (e.g. at a higher rate for exceeding the amount of time that was reserved).

The PSIRS 200 can also be implemented without sensors 258 at all. For example, if entrants to the parking area 250 is limited to only those using the PSIRS 200 to reserve or obtain a space, the PSIRS 200 can determine the number of available parking spaces by a simple calculation comparing the number of spaces to the difference between the number of vehicles entering the parking area 250 and the number of vehicles leaving the parking area 250.

The PSIRS 200 can also be used to reserve only a percentage of the available parking spaces, to assure nearly 100% availability for users with reservations, even if some users do not promptly evacuate their vehicles. Payment for access to the PSIRS to allow reservation of parking spaces 304, or for access to the parking spaces 304 themselves, may be effected by the user (or a third party) via a range of options. Individual users 219 may pay a flat monthly subscription rate, a fee-per-service with monthly billing, or a payment at time of use via online credit card data or services like PAYPAL. Corporations and groups may enroll their employees or members. Third parties may pay for advertising that accompanies the service. This is especially advantageous for local businesses as advertising is highly directed to potential customers, and can be time-sensitive. Parking area 250 owners may pay to be listed by the PSIRS 200, or may pay a percentage of fees collected from drivers routed to the owner's parking area 250 (a business model similar to the relationship between airlines and travel agents, wherein each airline formerly paid travel agents who booked flights on that airline).

Additional Services

In a preferred embodiment, the system may be operated with varying levels of service available to different subscribers, just as phone service or cable TV operate now. For example, some may subscribe to a basic text-only service with a limited number of events per month during certain times each day, paying extra for cases where they request a digital map, a human conversation, more than the allowed number of events, or events outside the allowed hours. Others may subscribe for an unlimited number of service events with full graphics and speech support for an extended period of time. When a camera view of the parking space 304 is available, subscribers with appropriate authorization may request and receive a current image of the parking space 304. A few users may choose a premium service where a vehicle-mounted GPS receiver continuously sends the subscriber's location to the system, and the system continuously responds with the location of the nearest available parking space.

Similarly, advertisers 220 may choose varying levels of service. For example, some may pay for a premium service where they can upload large new graphic images every minute and where their ads get top priority for display to people parking in certain areas at certain times. Others may pay for a basic service where they get one mid-sized graphic per month, with ads displayed to random subscribers. Others may use the service as an adjunct to their standard on-line advertising. For example, a retailer's web site would include a "find parking" button that invokes the service to help a potential customer find, and perhaps reserve, a parking place near the store.

A further auxiliary service may be used to provide a reminder of where the user 219 parked. The system keeps a record of the most recent recommended parking space 304. If the user 219 emerges from a day of meetings and can't remember where the user 219 found parking in the maze of streets near the user's destination, the user 219 can access the service for a reminder. A premium service makes this information available to other authorized people so they can find the user's vehicle. This can be useful for couples who share a car, or for companies that provide off-site automobile maintenance or repair.

CONCLUSION

This concludes the description of the preferred embodiments of the present invention. In summary, the present invention describes a method, apparatus, and article of manufacture for determining the availability of parking spaces and for reserving available parking spaces. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of managing a plurality of parking spaces including a plurality of full sized parking spaces and a plurality of compact parking spaces, comprising the steps of:

accepting data indicating an occupancy status of at least a subset of the plurality of parking spaces;

generating a parking database describing an availability of one or more of the parking spaces from the accepted data;

accepting a request from a user, the request being for data describing the availability of the one or more of the parking spaces from the parking database;

providing the data describing availability of the one or more of the parking spaces to the user;

accepting a reservation request from the user, the reservation request including a license number of a vehicle and a parking space size selected from the group comprising compact and full-size;

comparing the license number with a database of vehicles to confirm that the vehicle size is appropriate for the selected parking space size; and reserving at least one of the parking spaces in the subset of the parking spaces according to the accepted reservation request if the vehicle size is appropriate for the selected parking space size.

2. The method of claim 1, wherein the data is accepted in an operations center physically remote from the parking spaces.

3. The method of claim 1, further comprising the step of determining the occupancy status of the subset of the parking spaces.

4. The method of claim 3, wherein the subset of the parking spaces comprises a group of parking spaces together defining a parking area, and the occupancy status of the subset of the parking spaces is determined by a capacity of the parking area and a difference between a count of vehicles entering the parking area and a count of vehicles leaving the parking area.

5. The method of claim 3, wherein the occupancy status of the subset of parking spaces is determined from the accepted data according to a predictive model based an historical accepted data.

6. The method of claim 3, wherein the occupancy status of each of the parking spaces of the subset of parking spaces is determined by a sensing device proximate the parking space associated therewith.

7. The method of claim 6, wherein the sensing device comprises a ferrous sensor.

8. The method of claim 6, wherein the sensing device comprises an optical sensor.

9. The method of claim 6, wherein the sensing device comprises an infrared sensor.

10. The method of claim 6, wherein the occupancy status is continuously detected and provided to the operations center if the occupancy status changes.

11. The method of claim 1, wherein:

the request from the user comprises a destination;

the provided data describing the availability of the one or more parking spaces identifies parking spaces within a distance of the destination.

12. The method of claim 11, wherein:

the request from the user further comprises a preferred parking space attribute; and the provided data describing the availability of the one or more parking spaces identifies parking spaces meeting the preferred parking space attribute.

13. The method of claim 12, wherein the attributes are selected from the group comprising:

a proximity of the parking space to the destination;
a security level of the parking space;
a cost of the parking space;
illumination of the parking space; and
exposure of the parking space to the Sun.

14. The method of claim 1, further comprising the step of providing a voucher documenting the reserved at least one of the parking spaces to the user at the user's remote location.

15. The method of claim 14, wherein the voucher comprises an authorization code.

16. The method of claim 1, further comprising the step of:
providing a reminder of the location of the reserved at least one of the parking spaces.

17. A parking space management system, comprising:
an operations center, having:
a parking database, describing an availability of one or more of the parking spaces, including a plurality of full size parking spaces and a plurality of compact size parking spaces, the parking database generated using data describing an occupancy status of at least a subset of the plurality of parking spaces; and
a parking database interface, for accepting the data indicating the occupancy status of at least a subset of the parking spaces, for accepting a request from a user, the request being for the data describing the availability of one or more of the parking spaces, and for providing the data describing the availability of the one or more of the parking spaces to the user, the parking database interface comprising:
a module for accepting a reservation request from the user and for reserving at least one of the parking spaces in the subset of parking spaces in response to the accepted reservation request, wherein:
the reservation request comprises a license number of a vehicle and a parking space size selected from the group comprising compact and full size; and
the module further compares the license number with a database of vehicles to confirm that the vehicle size is appropriate for the selected parking space size and further reserves at least one of the parking spaces in the subset of the parking spaces according to the accepted reservation request if the vehicle size is appropriate for the selected parking space size.

18. The apparatus of claim 17, wherein the availability of the one or more of the parking spaces is determined according to a predictive model using historical data describing the occupancy status of at least a subset of the plurality of parking spaces.

19. The apparatus of claim 17, further comprising a plurality of occupancy sensors, for detecting an occupancy status of a parking space associated therewith.

20. The apparatus of claim 17, wherein the subset of the parking spaces comprises a group of parking spaces together defining a parking lot, and the occupancy status of the subset of the parking spaces is determined by a difference between a count of vehicles entering the parking lot and a count of vehicles leaving the parking lot.

21. The apparatus of claim 19, wherein the occupancy sensors are selected from the group comprising:

a ferrous detector;
an optical detector; and
an infrared detector.

22. The apparatus of claim 19, wherein each occupancy sensor is associated with one of the plurality parking spaces and detects an occupancy status of the one of the parking spaces.

23. The apparatus of claim 17, wherein the operations center is remote from the parking spaces.

24. The apparatus of claim 17, wherein:
the request from the user comprises a destination;
the provided data describing the availability of the one or more parking spaces consists of data describing parking spaces within a specified distance of the destination.

25. The apparatus of claim 24, wherein the specified distance is user-specified.

26. The apparatus of claim 24, wherein:
the request from the user further comprises a preferred parking space attribute; and
the provided data describing the availability of the one or more parking spaces identifies parking spaces meeting the preferred parking space attribute.

27. The apparatus of claim 26, wherein the attributes are selected from the group comprising a proximity of the parking space to the destination;
a security level of the parking space;
a cost of the parking space;
illumination of the parking space; and
exposure of the parking space to the Sun.

28. The apparatus of claim 17, wherein the parking database interface further provides a voucher documenting the reserved at least one of the parking spaces to the user at the user's remote location.

29. The apparatus of claim 17, wherein the module further provides a reminder of the location of the reserved at least one of the parking spaces.

30. The apparatus of claim 17, wherein:
the data describing availability of the one or more parking spaces to the user includes availability data for each individual parking space; and
the reservation request comprises a request for a particular one of the individual parking spaces in the subset of parking spaces.

31. An apparatus for managing a plurality of parking spaces, including a plurality of full size parking spaces and a plurality of compact size parking spaces, comprising:
means for accepting data indicating an occupancy status of at least a subset of the plurality of parking spaces;
means for generating a parking database describing an availability of one or more of the parking spaces from the accepted data;
means for accepting a request from a user, the request being for data describing the availability of the one or more of the parking spaces from the parking database;
means for providing the data describing availability of the one or more of the parking spaces to the user;
means for accepting a reservation request from the user, the reservation request including a license number of a vehicle and a parking space size selected from the group comprising compact and full-size;
means for comparing the license number with a database of vehicles to confirm that the vehicle size is appropriate for the selected parking space size; and
means for reserving at least one of the parking spaces in the subset of the parking spaces according to the accepted reservation request if the vehicle size is appropriate for the selected parking space size.

32. The apparatus of claim 31, wherein the data is accepted in an operations center physically remote from the parking spaces.

33. The apparatus of claim 31, further comprising means for determining the occupancy status of the subset of the parking spaces.

34. The apparatus of claim 33, wherein the occupancy status of the subset of parking spaces is determined from the accepted data according to a predictive model using historical accepted data.

35. The apparatus of claim 33, wherein the occupancy status of each of the parking spaces of the subset of parking spaces is determined by a sensing device proximate the parking space associated therewith.

36. The apparatus of claim 35, wherein the sensing device comprises a ferrous detector.

37. The apparatus of claim 35, wherein the sensing device comprises an optical detector.

38. The apparatus of claim 35, wherein the sensing device comprises an infrared detector.

39. The apparatus of claim 35, wherein the occupancy status is continuously detected and provided to the operations center if the occupancy status changes.

40. The apparatus of claim 33, wherein the subset of the parking spaces comprises a group of parking spaces together defining a parking lot, and the occupancy status of the subset of the parking spaces is determined by a difference between a count of vehicles entering the parking lot and a count of vehicles leaving the parking lot.

41. The apparatus of claim 31, wherein:

the request from the user comprises a destination;

the provided data describing the availability of the one or more parking spaces identifies parking spaces within a distance of the destination.

42. The apparatus of claim 41, wherein:

the request from the user further comprises a preferred parking space attribute; and the provided data describing the availability of the one or more parking spaces identifies parking spaces meeting the preferred parking space attribute.

43. The apparatus of claim 42, wherein the attributes are selected from the group comprising:

a proximity of the parking space to the destination;

a security level of the parking space;

a cost of the parking space;

illumination of the parking space; and exposure of the parking space to the Sun.

44. The apparatus of claim 31, further comprising means for providing a voucher documenting the reserved at least one of the parking spaces to the user at the user's remote location.

45. The apparatus of claim 44, wherein the voucher comprises an authorization code.

46. The apparatus of claim 31, further comprising the step of:

providing a reminder of the location of the reserved at least one of the parking spaces.

47. The method of claim 1, wherein the compact size parking spaces are grouped together and securely delineated from the full-sized parking spaces.

* * * * *